(No Model.)  2 Sheets—Sheet 1.

J. RADDIN.
SAFETY ATTACHMENT TO CAR TRUCKS.

No. 273,307.  Patented Mar. 6, 1883.

WITNESSES  INVENTOR (No Model.) 2 Sheets—Sheet 2.
J. RADDIN.
SAFETY ATTACHMENT TO CAR TRUCKS.

No. 273,307. Patented Mar. 6, 1883.

WITNESSES
INVENTOR

UNITED STATES PATENT OFFICE.

JOHN RADDIN, OF LYNN, MASSACHUSETTS.

SAFETY ATTACHMENT TO CAR-TRUCKS.

SPECIFICATION forming part of Letters Patent No. 273,307, dated March 6, 1883.

Application filed January 25, 1882. (No model.)

*To all whom it may concern:*

Be it known that I, JOHN RADDIN, of Lynn, in the county of Essex and State of Massachusetts, a citizen of the United States, have invented a new and useful Improvement in Safety Attachments to Axles and Wheels in the Running-Gear of Cars, of which the following is a full, clear, and exact description, reference being had to the accompanying drawings, in which like letters denote corresponding parts.

Figure 1:
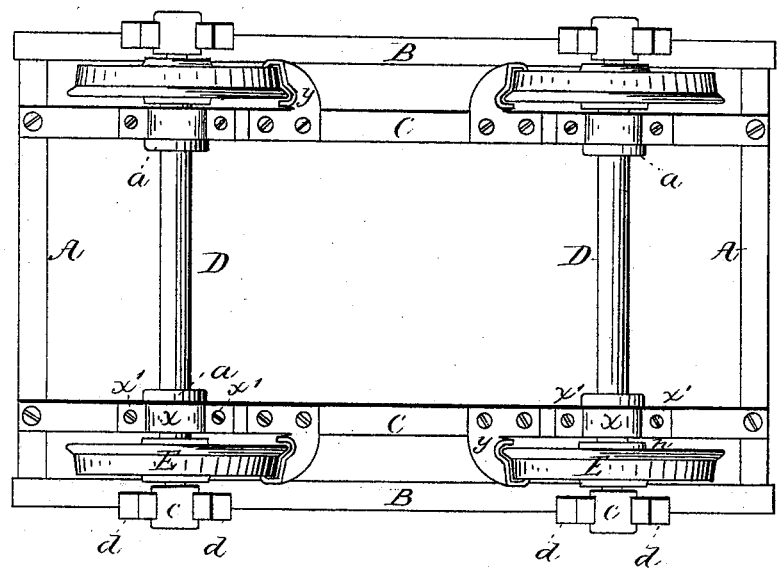

Figure 1 is a general view of the frame of a car-truck, in which A A are transverse timbers of the frame, and B B longitudinal timbers. D D are the axles. C C are supplemental longitudinal timbers fastened to the transverse timbers of the frame of the truck.

Figure 2:
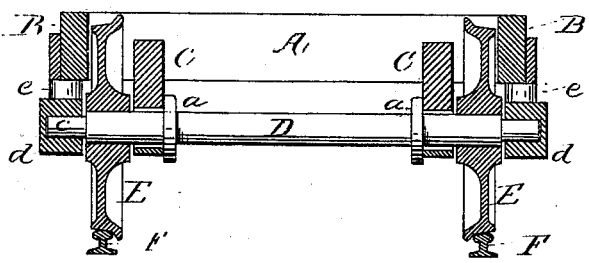

Fig. 2 is a cross-section of a car-truck in which the several parts of the axle and its connections are particularly shown, D being the axle; E, the car-wheel; $a$, the collar; $b$, the hub-seat; $c$, the journal; $d$, the box; $e$, the spring; F, the rail upon which the wheel E rests.

Figure 3:
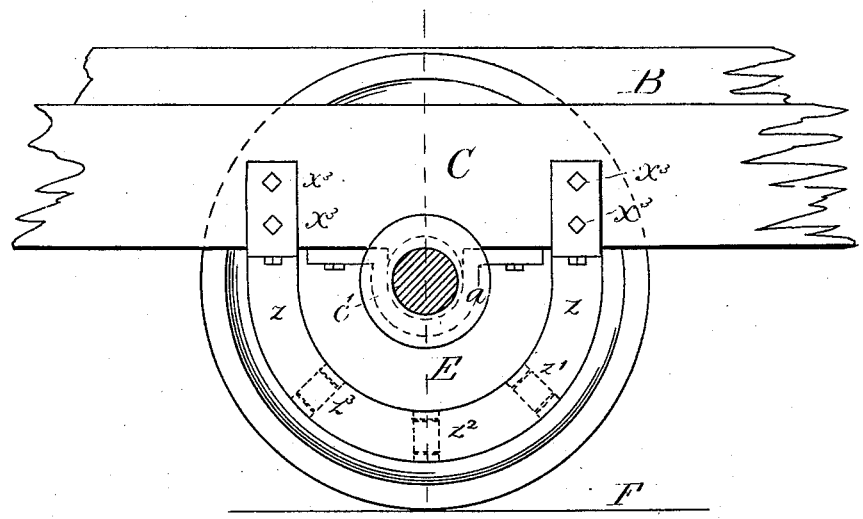
Figure 4:
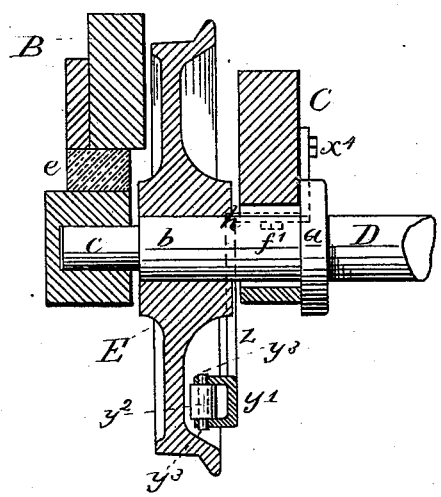

Fig. 3 is a view of a car-wheel and part of the frame, and Fig. 4 is a cross-section of a car axle and wheel in which the different parts are represented.

The nature of my invention is more particularly confined to the application or adjustment to the car-truck of devices for preventing accidents caused by the breaking of the axle or wheel.

In order to obtain this end I would say that car-axles almost invariably break at a point near the hub, just inside of the wheel, and which I have indicated in Fig. 3 by $h$. It is obvious that when a car-axle breaks at the point I have named the natural result is, that it will fall downward, and the moment that it strikes the ground would almost of necessity throw the wheel to which it was still connected from the track; or, if this did not happen, by reason of the end of the axle striking upon some intervening temporary support, yet the other wheel, which is left without any support from the axle, must turn over or twist from the rail.

It is evident that two things must thus be provided for to prevent accident or damage ensuing from the breakage of an axle at or near the point which I have indicated: First, something in the nature of a supplemental bearing or support must be furnished to the axle between the breaking-point and the opposite wheel; second, the wheel which has lost its vertical support by reason of the axle's breaking near the wheel must be supported in its position by some device which shall prevent it from crippling or turning over, and thus becoming the occasion of injury or accident. For this purpose I place upon the axle near each wheel a cap or plate which shall act in the nature of a supplemental bearing in case the axle breaks at or near the inside of the hub-seat. This I attach either to the longitudinal piece C by suitable bolts, $x'$, or otherwise, the parts C being connected with the frame-work of the truck.

In connection with the part $x$, I place upon the axle a collar, $a$, one upon each side of the axle, inside of the pieces C C. These collars $a$ are so placed to prevent the slipping or shifting of the axle in its bearings in consequence of the snapping of the axle at $h$.

It is not intended that the parts $x$ should press upon the axle so long as the same remains unbroken, but to be so placed, so secured, and so applied that in case of breakage at or near the point $h$, as indicated, the end of the axle will have sufficient support and be secured from shifting by the collar $a$, so that the opposite wheel, E, will not be materially affected by the breakage of the axle.

In order to support the wheel which has lost its connection with the axle by reason of the break, I attach a plate to the longitudinal pieces C C, as shown in Fig. 1, and which are marked $y$, secured to the frame-piece C by suitable bolts or other attachments, $x^2$. The same object may be attained by equivalent devices applied in any convenient manner to the framework of the truck, or to cross-pieces secured to the side frame of the truck, made for and attached thereto, according to the special design or style of truck employed. For instance, I represent in Fig. 3 another device by which the wheel which has become detached from the axle at the point $h$ may be supported. $z$ represents a semicircular plate, which is secured to the part C by bolts or suitable attachments, (represented by $x^3$.) Upon the inside—that is, next the wheel upon $z$—I place at the points indicated by $z' z^2 z^3$ anti-friction rollers, one of which is shown in Fig. 4, $y^2$, the bearings of the roller being represented by $y^3$, and $y'$ being the frame in which the roller is placed, and which is attached to the plate $z$.

I do not desire to confine myself to the particular form of devices represented in the accomplishment of my purpose; but I conceive it necessary that there should be the three elements combining to make the invention complete—that is to say, an axle-supporting device which shall prevent the long arm of the axle when broken from falling, a device which shall prevent a transverse shifting of the axle after breakage; also, in connection with these, a suitable supporting device for the unsupported wheel, and in this consists the material part of my present invention.

I am aware that attempts have been made to support car-wheels, in case of accident, by hoods or casing covering the wheels, either upon one side or upon both sides. As it is well known that the car wheels and axles require frequent examination in order that the least sign of fracture may be detected, and that such examination is and must be quickly and readily made during the time the trains are stopped at stations, it is of course highly important that the wheel-supports cover the sides of the wheel as little as possible. It is manifest that any form of support which perceptibly hinders the necessary examination, or which necessitates a very partial and imperfect examination, tends to invite the very danger against which protection is sought. Formerly when railway-cars made short runs it was not as important to have frequent examinations of wheels and axles; but the long distances which cars are now run continuously renders frequent examinations absolutely necessary. My form of wheel-supports fully allows this distinct examination of the wheels, hubs, and axles, and herein lies one important element of my invention.

Having thus described my invention with sufficient particularity, so that any one conversant with car-building or the attachment of safety appliances to cars or the trucks of cars may readily understand it, what I claim, and desire to secure by Letters Patent of the United States, is—

1. In a car-truck, the combination of the supporting-plate $y$ and frame C, arranged substantially as and for the purposes described.

2. The axle D, provided with a collar, $a$, and the wheel E and frame C, in combination with the supporting devices $z$, with anti-friction rollers or pulleys $y^2$, substantially as and for the purposes set forth.

3. In a car-truck, the wheel-supporting device $z$, with anti friction rollers or pulleys $y^2$, in combination with the frame C and wheels E, all arranged substantially as and for the purposes set forth.

4. In the running-gear of cars, the axle D, collar $a$, circular supporting-plate or supplemental bearing $f$, and frame C, in combination with the wheel-supports $y$ and $z$ and frame B, all united and co-operating substantially as and for the purposes set forth.

JOHN RADDIN.

Witnesses:
BOWDOIN S. PARKER,
FRED. HARRIS.